(12) United States Patent
McGregor

(10) Patent No.: US 7,996,933 B2
(45) Date of Patent: Aug. 16, 2011

(54) WASTEWATER HEAT RECOVERY DEVICE AND METHOD

(76) Inventor: Garth Kennedy McGregor, Wanganui (NZ)

( * ) Notice: Subject to any disclaimer, the term of this patent is extended or adjusted under 35 U.S.C. 154(b) by 487 days.

(21) Appl. No.: 11/577,291

(22) PCT Filed: Oct. 14, 2005

(86) PCT No.: PCT/NZ2005/041320
§ 371 (c)(1),
(2), (4) Date: Apr. 24, 2009

(87) PCT Pub. No.: WO2006/041320
PCT Pub. Date: Apr. 20, 2006

(65) Prior Publication Data
US 2009/0218080 A1    Sep. 3, 2009

(30) Foreign Application Priority Data
Oct. 15, 2004    (NZ) ........................... 535969

(51) Int. Cl.
*A47K 3/28*    (2006.01)
(52) U.S. Cl. ........... 4/598; 4/596; 4/597; 4/661; 165/47; 165/66; 165/909
(58) Field of Classification Search ............. 4/545, 596, 4/597, 598, 661; 165/47, 66, 181, 909
See application file for complete search history.

(56) References Cited

U.S. PATENT DOCUMENTS

| | | | |
|---|---|---|---|
| 3,263,242 A * | 8/1966 | Will | 4/598 |
| 4,300,247 A * | 11/1981 | Berg | 4/598 |
| 4,341,263 A | 7/1982 | Arbabian | |
| 4,352,391 A | 10/1982 | Jönsson | |
| 4,619,311 A | 10/1986 | Vasile et al. | |
| 4,821,793 A * | 4/1989 | Sheffield | 165/47 |
| 5,143,149 A * | 9/1992 | Kronberg | 165/66 |
| 5,148,858 A | 9/1992 | Ovretveit | |
| 5,736,059 A | 4/1998 | Mackelvie | |
| 5,857,515 A | 1/1999 | Skupien | |

(Continued)

FOREIGN PATENT DOCUMENTS

BG    50683 A    10/1992

(Continued)

OTHER PUBLICATIONS

Hayden Luckman, *Whiz Kid Develops Heat Exchange Unit*, New Zealand Engineering News, Aug. 2004, pp. 22.

(Continued)

*Primary Examiner* — Steven J Ganey
(74) *Attorney, Agent, or Firm* — Workman Nydegger

(57) ABSTRACT

A trap for recovering heat energy from a liquid has a chamber 7 with an internal baffle wall 45-48. An upper chamber opening 9 and a weir at an inlet end 13 of a discharge conduit 11 are on opposite sides of the baffle wall. Liquid fed into the chamber via the upper opening flows downward and under the baffle wall before flowing upward and over the weir to be discharged from the chamber through the discharge conduit. A second liquid flows through a heat exchange conduit 17-24. One preferred embodiment has a concentric arrangement of a plurality of cylindrical baffle walls alternating with a plurality of cylindrical chambers of the heat exchange conduit. A corresponding method of heat recovery is also claimed. In one preferred application, the trap is fitted into the base or floor tray of a shower for recovery of heat energy from waste shower water.

14 Claims, 3 Drawing Sheets

U.S. PATENT DOCUMENTS

| | | |
|---|---|---|
| 6,499,534 B1 | 12/2002 | Tawney et al. |
| 6,722,421 B2 | 4/2004 | MacKelvie |
| 7,849,530 B2 * | 12/2010 | Hendricks .......................... 4/596 |

FOREIGN PATENT DOCUMENTS

| | | |
|---|---|---|
| CN | 2247792 | 2/1997 |
| CN | 2295188 | 10/1998 |
| CN | 2310304 | 3/1999 |
| CN | 2327978 | 7/1999 |
| CN | 2357308 | 1/2000 |
| CN | 1068110 | 7/2001 |
| CN | 2460583 | 11/2001 |
| CN | 2581932 | 10/2003 |
| CS | 272 297 | 9/1989 |
| DE | 25 50 320 A1 | 5/1977 |
| DE | 196 08 404 A1 | 5/1997 |
| DE | 200 13 530 U1 | 10/2000 |
| EP | 0 513 705 A1 | 11/1992 |
| GB | 2 295 666 A1 | 6/1996 |
| GB | 2 342 146 A1 | 4/2000 |
| GB | 2 385 785 A1 | 9/2003 |
| GB | 2 389 373 A1 | 12/2003 |
| NL | 1015561 C2 | 1/2002 |
| NZ | 250784 | 4/1995 |
| NZ | 528273 | 10/2004 |
| RU | 1820163 A1 | 6/1993 |

OTHER PUBLICATIONS

Hayden Luckman, *Luck Has Nothing To Do With It*, Apr./May 2003, http://www.eeca.govt.nz/content/EW_news/81may03/lucky.html.

* cited by examiner

WASTEWATER HEAT RECOVERY DEVICE AND METHOD

FIELD OF INVENTION

The present invention relates to energy saving and the recovery of heat from waste water and in particular to the recovery of heat from shower waste water.

BACKGROUND

A significant amount of energy used in domestic households is consumed in heating water. For example water is heated for personal washing, showering and bathing, and for washing in the laundry and kitchen. In many of these domestic applications, heated water is drained away to waste after use while still at a temperature elevated above the temperature of the incoming cold water fed to the household. This can represent a significant wastage of energy.

European Patent No. 513,705 "Heat exchanger for waste water piping" shows a heat exchanger with tubing helically wrapped about the pipe of a waste trap under a hand basin.

German Patent Application No. 196 08 404 "Shower waste water residual heat recovery" shows a heat exchanger built into a sloping sub-floor under a shower base. Waste water flows down the sloping floor.

New Zealand Patent No. 250784 "Heat recovery system for shower" describes a heat recovery system that is built into the base of a shower. Incoming cold water is fed through a heat exchanging pipe that is distributed across a substantial portion of the shower base.

United Kingdom Patent Application No. 2,295,666 "Shower using waste heat" describes a waste trap formed of inner and outer concentric tubes that together are arranged in a spiral pattern under the floor pan of a shower. The inner tube, which may be corrugated, feeds water to the shower while the outer tube drains waste water from the shower.

United Kingdom Patent Application No. 2,342,146 "Heat exchanger" describes a heat exchanger that is connected into the outlet from a waste trap under a shower base. Heat transferred from the shower waste water pre-heats fresh water being fed to the shower.

United Kingdom Patent Application No. 2,385,785 "Domestic shower waste water heat exchanger" describes a heat exchanger that is fitted in the drain pipe of a bath having a shower overhead. Heat from the waste water preheats the supply to the shower.

United Kingdom Patent Application No. 2,389,373 "Shower waste trap" describes a shower waste trap having a central waste water chamber surrounded by a jacket through which incoming cold water is fed. The jacket has baffles arranged in a spiral pattern which are said to direct water evenly around the heat exchanger, increase the surface area in contact with the cold water and strengthen the exchanger.

U.S. Pat. No. 4,300,247 "Energy conservation in shower bathing" describes a heat exchanger located under a shower base. The exchanger pre-heats incoming cold water with hot drain water. Incoming cold fresh water and hot drain water are forced to follow serpentine paths in opposite directions on opposite sides of a folded sheet, e.g. of copper.

U.S. Pat. No. 4,619,311 "Method and apparatus for recovering heat in waste water" describes a heat exchanger which has been marketed as the GFX (gravity film exchange) water heater booster. This device has also been described in "Award-Winning GFX Water Heater Booster" at http://gfx-technology.com and in "Inventions and Innovation—Success Story", at http://www.eere.energy.gov/inventions/pdfs/waterfilm.pdf.

The GFX system uses a double-walled vented copper pipe to recover heat energy from wastewater to preheat incoming water, and is said to work while the drain and supply lines are in concurrent use, for example when someone is having a shower. Cold water fed through a tube wound spirally around a vertical waste pipe is preheated and passed simultaneously to the shower mixer and to the hot water storage cylinder.

U.S. Pat. No. 5,857,515 "Heat exchanging device" describes a finned heat conductive exchanger (eg of aluminium) which is fitted in the wall of a waste water pipe (eg of PVC). A cold water feed pipe (eg of copper) is in thermal contact with the heat exchanger. In a typical implementation, the waste pipe carries heated waste water from a shower and the cold feed pipe carries water which is eventually mixed with the a warm water supply for the shower. The cold feed is thus preheated by heat recovered from the shower waste water.

These prior art arrangements do not describe a waste trap heat exchanger that is easily accessible for cleaning and/or that can be readily retrofitted in the base or floor tray of an existing shower installation.

SUMMARY OF INVENTION

It is one object of the invention to provide an apparatus method for the recovery of heat energy from waste water passing through a shower waste trap, or at least to provide the public with a useful alternative.

Another object of the invention is to provide a method for the recovery of heat energy from waste water passing through a shower waste trap.

In a first aspect the present invention may be broadly said to be a trap consisting, at least in part, of:
- a chamber for holding a first liquid and having a bottom floor and an upper opening at which liquid can be delivered into the chamber;
- a discharge conduit having an outlet end located outside the chamber and an inlet end located inside the chamber and lower than the upper opening of the chamber, the inlet end terminating at a weir over which liquid in the chamber must flow to be discharged from the chamber through the discharge conduit;
- a baffle wall which extends upward from above the chamber floor to above the inlet end of the discharge conduit, the upper opening of the chamber and the inlet end of the discharge conduit being on opposite sides of the baffle wall; and
- a heat exchange conduit for passage of a second liquid, a portion of the heat exchange conduit being located in the chamber and lower than the weir,
- wherein the baffle wall substantially surrounds the inlet end of the discharge conduit, so that in use liquid delivered to the chamber at the upper opening passes downward and under the baffle wall before flowing upward and over the weir to be discharged from the chamber through the discharge conduit.

The trap is preferably a waste water trap and may be attached to, or integral with, a base or floor tray of a shower.

Preferably, the baffle wall is removably attachable to the inlet end of the discharge conduit.

Preferably, the baffle wall and the discharge conduit are each circularly cylindrical and mutually coaxial, and the said portion of the heat exchange conduit is a circularly cylindrical annular chamber which surrounds, and is coaxial with, the discharge conduit and extends upward from the chamber floor.

Preferably, the said portion of the heat exchange conduit includes a plurality of circularly cylindrical annular chambers each one of which surrounds and is coaxial with the discharge conduit and extends upward from the chamber floor, the baffle wall is one of a plurality of baffle walls each of which extends upward from above the chamber floor to above the inlet end of the discharge conduit, the baffle walls being circularly cylindrical and arranged coaxially and alternately with the annular chambers, the upper opening of the chamber being outside the radially outermost baffle wall, so that in use liquid delivered to the chamber at the upper opening flows alternately downward and upward between adjacent baffle walls and annular chambers, passing under each baffle wall and over each annular chamber, before flowing over the weir to be discharged from the chamber through the discharge conduit.

Preferably, the chamber has a side wall which extends between the bottom floor and the upper opening, and the chamber side wall, the baffle wall and the discharge conduit are each circularly cylindrical and mutually coaxial.

In a second aspect the present invention may be broadly said to be a method of recovering heat energy from a first liquid delivered to a chamber, wherein the chamber has a bottom floor and an upper opening through which the first liquid can be delivered to the chamber, the chamber has a discharge conduit with an outlet end located outside the chamber and an inlet end located inside the chamber, the inlet end is lower than the upper opening of the chamber, the inlet end terminates at a weir over which the first liquid in the chamber must flow to be discharged from the chamber through the discharge conduit, the chamber has a baffle wall which extends upward from above the chamber floor to above the inlet end of the discharge conduit, the baffle wall substantially surrounds the inlet end of the discharge conduit, and the upper opening of the chamber and the inlet end of the discharge conduit are on opposite sides of the baffle wall; the method comprising the steps of:

(a) delivering the first liquid through the upper opening and into the chamber, (b) passing the first liquid delivered into the chamber downward, under the baffle wall, and then upward and over the weir, (c) discharging the first liquid passing over the weir from the chamber through the discharge conduit, and (d) passing a second liquid through a heat exchange conduit located in the chamber and lower than the weir.

Preferably, in the second aspect of the invention, the trap is a waste water trap, which may be attached to, or integral with, a base or floor tray of a shower.

Preferably, in the second aspect of the invention, the baffle wall is removably attachable to the inlet end of the discharge conduit.

Preferably, in the second aspect of the invention, the baffle wall and the discharge conduit are each circularly cylindrical and mutually coaxial, and the heat exchange conduit is a circularly cylindrical annular chamber which surrounds, and is coaxial with, the discharge conduit and extends upward from the chamber floor.

Preferably, in the second aspect of the invention, the heat exchange conduit includes a plurality of circularly cylindrical annular chambers each one of which surrounds and is coaxial with the discharge conduit and extends upward from the chamber floor, the baffle wall is one of a plurality of baffle walls each of which extends upward from above the chamber floor to above the inlet end of the discharge conduit, the baffle walls being circularly cylindrical and arranged coaxially and alternately with the annular chambers, the upper opening of the chamber being outside the radially outermost baffle wall, the method comprising the step of:

(e) passing the liquid delivered into the chamber at the upper opening alternately downward and upward between adjacent baffle walls and annular chambers, the liquid passing under each baffle wall and over each annular chamber, before flowing over the weir to be discharged from the chamber through the discharge conduit.

Preferably, in the second aspect of the invention, the chamber has a side wall which extends between the bottom floor and the upper opening, and the chamber side wall, the baffle wall, and the discharge conduit are each circularly cylindrical and mutually coaxial.

The invention may further be said to consist in any alternative combination of parts, features or steps mentioned herein or shown in the accompanying drawings. Known equivalents of these parts, features or steps which are not expressly set out are nevertheless deemed to be included.

BRIEF DESCRIPTION OF DRAWINGS

Preferred embodiments of the invention will now be further described, by way of example only and without intending to be limiting, with reference to the accompanying drawings of which.

DETAILED DESCRIPTION OF THE PREFERRED EMBODIMENTS

Figure 1:
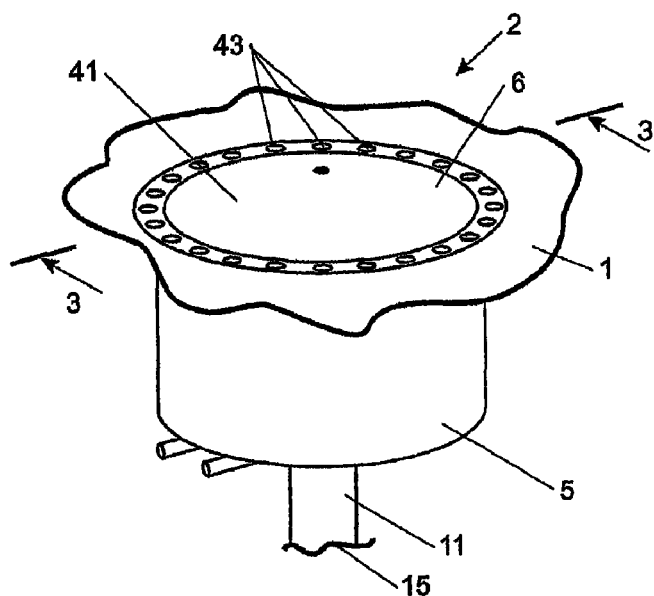
FIG. 1 shows a perspective view of a fragment of a shower floor tray fitted with a wastewater trap according to the current invention.

Referring to the drawings it will be appreciated that a waste trap may be implemented in various forms. The following embodiments are described by way of example only. For convenience of explanation, the drawings show the device orientated as used in a typical application in a generally horizontal, or slightly sloping, shower base. However, it is to be understood that the invention is not limited to the orientation shown.

Figure 2:
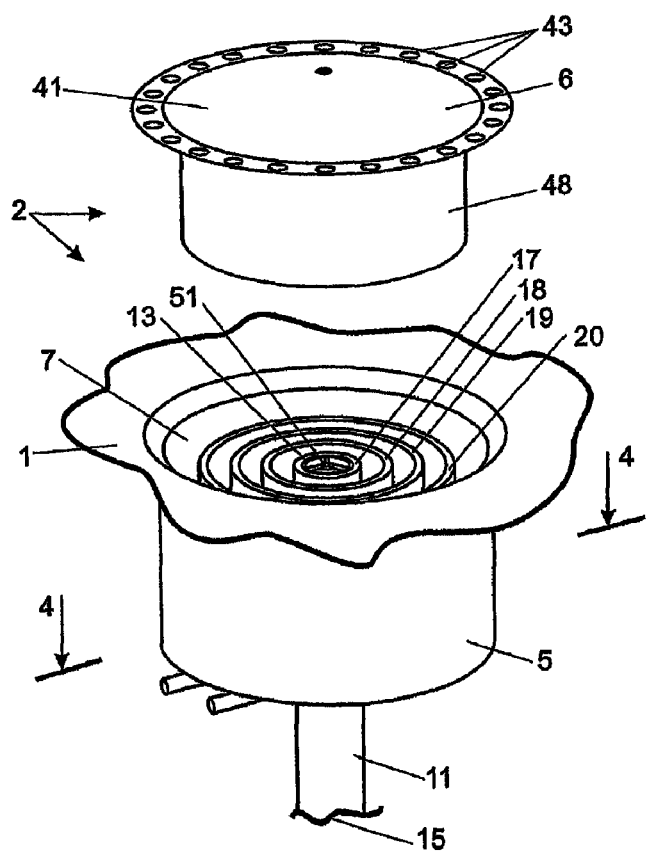
FIG. 2 shows the floor tray and trap of FIG. 1 disassembled to show a base unit of the wastewater trap fitted to the floor tray and a trap cover overhead.

FIGS. 1 and 2 show a fragment of a generally flat base or floor tray 1 of a shower. The floor tray has an aperture into which a wastewater trap 2 is fitted. The trap is in two parts; a trap base unit 5 which defines a trap chamber and a lid or cover 6 which is releasably fitted to the base unit 5.

The trap base unit 5 may be fixed to the shower floor tray 1, for example by welding. Alternatively, the base unit may be made integrally with the floor tray, for example by both being simultaneously pressed from a common sheet of material. In either case stainless steel is a suitable material for forming the shower floor tray and the waste trap base. Alternatively, the trap base unit may be manufactured from stainless steel and fitted by suitable known means to a floor tray made of other materials such as ceramic tiles over a supportive base structure.

The waste trap base unit 5 has a circularly cylindrical trap chamber 7 with a circular bottom floor 8 and an annular upper opening 9 at which waste water from the shower flows into the trap. A discharge conduit 11 is located at the centre of the chamber and has an upper inlet end 13 in the chamber at a level below the upper opening 9 of the trap chamber 7. The discharge conduit extends downward, through the bottom floor 8 of the chamber, to an outlet end 15 below the chamber.

Four heat exchanger chambers 17, 18, 19, 20 extend upward from the bottom floor 8 of the trap chamber 7. The heat exchanger chambers are annular, coaxial and generally circularly cylindrical. The four heat exchanger chambers are connected together in series by a set of three linking conduits 21, 22, 23 located under the bottom-floor of the trap chamber. The series connected heat exchanger chambers together form a heat exchanger conduit.

The heat exchanger conduit has an inlet conduit 24 which passes under and through the bottom floor 8 of the trap chamber to connect with the radially innermost annular chamber 17 at an inlet 25. Diametrically opposite this inlet 25, the innermost first annular chamber 17 has an outlet 26 which connects the first annular chamber 17 via a linking conduit 21 to an inlet 27 of a next outer second annular chamber 18. Diametrically opposite this inlet 27, the second annular chamber 18 has an outlet 29 which connects via a linking conduit 22 to an inlet 31 of a third annular chamber 19. Diametrically opposite this inlet 31, the third annular chamber 19 has an outlet 33 which connects via a linking conduit 23 to an inlet 35 of a radially outermost fourth annular chamber 20. Diametrically opposite this inlet 35, the fourth annular chamber 20 has an outlet 37 which connects to an outlet conduit 38 of the heat exchanging conduit.

The inlet conduit 24, the innermost annular chamber 17, linking conduit 21, annular chamber 18, linking conduit 22, annular chamber 19, linking conduit 23, outermost annular chamber 20 and outlet conduit 38 are all connected, in series, to provide the heat exchanging conduit.

The lid or cover 6 has a circular domed top plate 41 with a circular row of perforations 43 just inside the outer circumference. Four circularly cylindrical and coaxial baffle walls 45, 46, 47 48 depend concentrically from the underside of the domed top plate.

Figure 3:
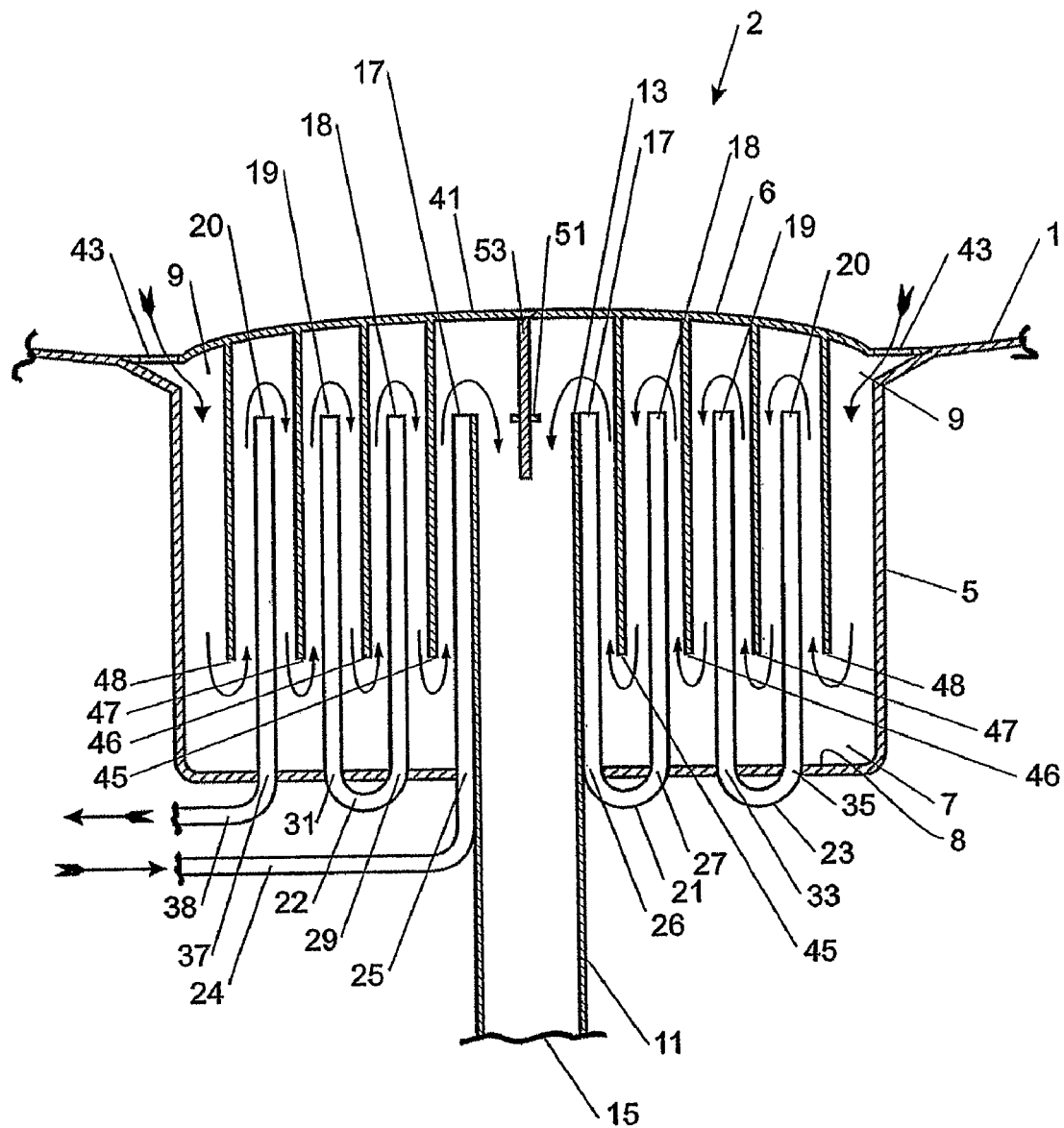
FIG. 3 shows a side view of a cross-section of the assembled trap as seen at line 3-3 of FIG. 1.

The cover 6 is releasably attachable to the trap base unit 5, with the cylindrical baffle walls 45, 46, 47, 48 alternating respectively with the annular heat exchanger chambers 17, 18, 19, 20, as may be best appreciated from the side cross-sectional view of the assembled cover and base unit shown FIG. 3. When the cover 6 is assembled with the base unit, the baffle walls 45, 46, 47, 48 are coaxial with the annular heat exchanger chambers and extend downwardly into the trap chamber 7 from a level above the inlet end 13 of the discharge conduit 11 to a level below that upper inlet end. The lower edges of the baffle walls are clear above the bottom floor 8 of the chamber.

In use, warm shower water flows from the shower floor tray 1 or domed top plate 41 and into the trap chamber 7 through the perforations 43 in the top plate or through any gap between the shower floor tray 1 or outer wall of the trap chamber and the outer circumferential perimeter of the domed top plate. This warm water flows down and under the outermost baffle wall 48, up and over the outermost annular heat exchanger chamber 20, and then down and under each baffle wall 47, 46, 45 and up and over each annular heat exchanger chamber 19, 18, alternately in turn, and finally flowing over the innermost annular chamber 17 to be discharged from the trap chamber by flowing down through the discharge conduit 11.

The discharge conduit 11 terminates at its upper inlet end 13 at a weir over which the waste water in the trap chamber must flow to be discharged from the chamber through the discharge conduit. In some embodiments, the upper inlet end of the discharge conduit is effectively provided by the upper end of the innermost annular heat exchanger chamber 17. As in known wastewater traps, the weir establishes a minimum level for water held in the trap chamber before the water overflows the weir and discharges to waste through the discharge conduit. The use of at least one baffle wall extending below the minimum water level establishes a barrier restricting flow, back up through the trap and into the shower cubicle, of gases and vapours from the downstream waste system to which, in use, the discharge conduit 11 is connected.

The multiple annular heat exchanger chambers are shown in the figures as having upper edges at a common level, and in common with the weir at the discharge conduit. However, the upper edges of the annular heat exchanger chambers can be at different levels.

Figure 4:
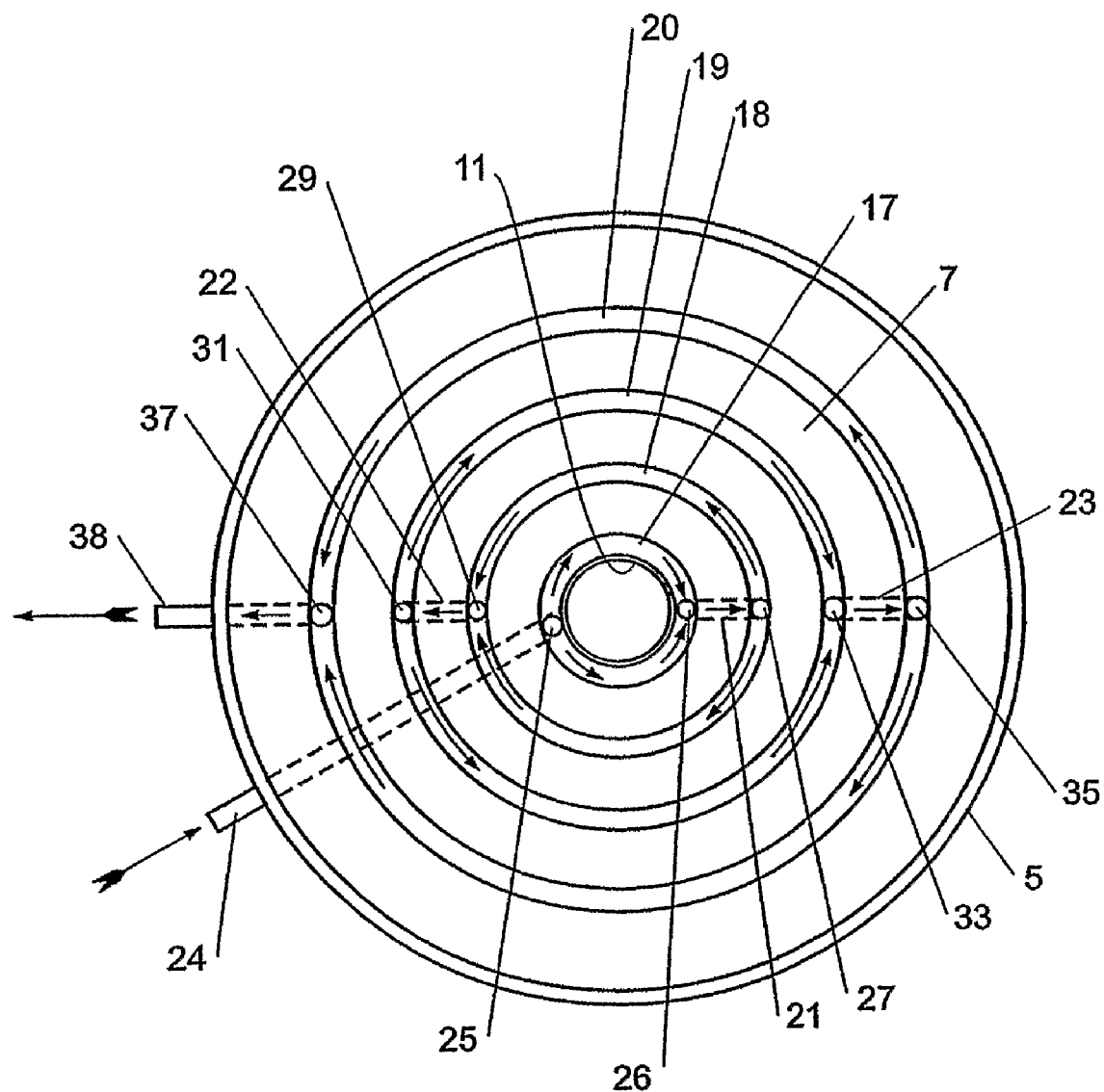
FIG. 4 shows a plan view of a cross section of the trap base unit as seen at line 4-4 of FIG. 2.

Incoming fresh cold water is fed via the heat exchanger conduit provided by the series connected annular heat exchanger chambers before being fed to a heat storage cylinder, or to an instant or flow-through heating device by which the water is heated for domestic use, including a shower. Alternatively, the incoming cold water may be fed directly to the shower via the heat exchanger conduit provided by the series connected annular heat exchanger chambers. The incoming cold water is fed via the inlet conduit 24 to the innermost annular chamber 17 to pass successively through each next outer annular chamber 18, 19, 20. This may be best appreciated by reference to the plan sectional view of the base unit as shown in FIG. 4 in which the arrows show the direction of water flows. The cold water passes through each annular chamber from its inlet to its diametrically opposite outlet to enhance the path length of cold water through the heat exchanger conduit.

During a shower, water runs to waste moving through the trap in a generally radially inward direction, flowing successively up the outer surface and down the inner surface of each annular heat exchanger chamber 20, 19, 18, 17 before discharging via the discharge conduit 11. Simultaneously, incoming cold water flows in a generally radially outward direction through the annular heat exchanger chambers 17, 18, 19, 20 where heat energy is transferred from the warmer waste water to pre-heat the colder incoming fresh water.

The arrangement, whereby these two flows move in opposing directions, enhances the transfer of heat energy between the two flows. Typically, the oppositely directed flows of fresh and waste water through the heat exchanger achieve about 4% improvement in efficiency over commonly-directed flows. The use of multiple baffle walls alternating with multiple annular heat exchange chambers increases the path length of the two interacting flows.

The coaxial arrangement of the baffles and the annular heat exchange chambers allows the cover to be withdrawn axially out of the chamber to allow for periodic cleaning of the waste trap. As may be seen in FIGS. 2 and 3, a support 51 is fixed across the upper inlet end 13 of the discharge conduit 11. The support 51 has a vertically aligned hole that is coaxial with the annular heat exchanger chambers and is provided with a screw thread. A complementary screw 53 is fixed to the underside of the domed cover plate 41, coaxial with the baffles. The cover 6 is fitted to the trap base unit by threading the cover screw 53 into the hole in the support 51 and rotating the cover 6 to bring its circumferential perimeter about level with the shower floor tray 1. The trap chamber 7 can then be readily accessed from above for cleaning or other maintenance simply by unscrewing the perforated cover 6 from the base unit 5.

The heat exchanging trap described above and as shown in the figures is relatively shallow, typically about 250 mm in height, and can be readily accommodated under standard shower floor trays in the same manner as existing traps.

The foregoing describes the invention including preferred forms thereof. Alterations and modifications as will be obvious to those skilled in the art are intended to be incorporated within the scope of the invention as defined in the accompanying claims. For example, the number of annular heat exchanger chambers and baffle walls can be varied while still being in accordance with the invention. Furthermore, the heat exchanger chambers could be formed into the annular shapes by coiling a continuous tube into a series of coaxial helixes.

List Of Features Labelled In The Figures shower floor tray 1
wastewater trap 2
trap base unit 5
cover 6
trap chamber 7
bottom floor 8
annular upper opening 9
discharge conduit 11
inlet end 13 of discharge conduit 11
outlet end 15 of discharge conduit 11
heat exchanger chambers 17, 18, 19, 20
linking conduits 21, 22, 23
inlet conduit 24
inlet 25 of innermost annular chamber 17
outlet 26 of innermost annular chamber 17
inlet 27 of annular chamber 18
outlet 29 of annular chamber 18
inlet 31 of annular chamber 19
outlet 33 of annular chamber 19
inlet 35 of outermost annular chamber 20
outlet 37 of outermost annular chamber 20
outlet conduit 38
domed top plate 41
perforations 43
baffle walls 45, 46, 47 48
support 51
screw 53

I claim:

1. A trap comprising:
   a chamber for holding a first liquid and having a bottom floor and an upper opening at which the first liquid can be delivered into the chamber;
   a discharge conduit having an outlet end located outside the chamber and an inlet end located inside the chamber and lower than the upper opening of the chamber, the inlet end terminating at a weir over which the first liquid in the chamber must flow to be discharged from the chamber through the discharge conduit;
   a baffle wall which extends upward from above the chamber floor to above the inlet end of the discharge conduit, the upper opening of the chamber and the inlet end of the discharge conduit being on opposite sides of the baffle wall; and
   a heat exchange conduit for passage of a second liquid, a portion of the heat exchange conduit being located in the chamber and lower than the weir,
   wherein the baffle wall substantially surrounds the inlet end of the discharge conduit, so that the first liquid delivered to the chamber at the upper opening passes downward and under the baffle wall before flowing upward and over the weir to be discharged from the chamber through the discharge conduit.

2. The trap as claimed in claim 1, wherein the trap is a waste water trap.

3. The trap as claimed in claim 2, wherein the trap is attached to, or integral with, a base or floor tray of a shower.

4. The trap as claimed in claim 1, wherein the baffle wall is removably attachable to the inlet end of the discharge conduit.

5. The trap as claimed in claim 1, wherein the baffle wall and the discharge conduit are each circularly cylindrical and mutually coaxial, and the said portion of the heat exchange conduit is a circularly cylindrical annular chamber which surrounds, and is coaxial with, the discharge conduit and extends upward from the chamber floor.

6. The trap as claimed in claim 5, wherein the said portion of the heat exchange conduit includes a plurality of circularly cylindrical annular chambers each one of which surrounds and is coaxial with the discharge conduit and extends upward from the chamber floor, the baffle wall is one of a plurality of baffle walls each of which extends upward from above the chamber floor to above the inlet end of the discharge conduit, the baffle walls being circularly cylindrical and arranged coaxially and alternately with the annular chambers, the upper opening of the chamber being outside the radially outermost baffle wall, so that in use liquid delivered to the chamber at the upper opening flows alternately downward and upward between adjacent baffle walls and annular chambers, passing under each baffle wall and over each annular chamber, before flowing over the weir to be discharged from the chamber through the discharge conduit.

7. The trap as claimed in claim 1, wherein the chamber has a side wall which extends between the bottom floor and the upper opening, and the chamber side wall, the baffle wall, and the discharge conduit are each circularly cylindrical and mutually coaxial.

8. A method of recovering heat energy from a first liquid delivered to a chamber, wherein the chamber has a bottom floor and an upper opening through which the first liquid can be delivered to the chamber, the chamber has a discharge conduit with an outlet end located outside the chamber and an inlet end located inside the chamber, the inlet end is lower than the upper opening of the chamber, the inlet end terminates at a weir over which the first liquid in the chamber must flow to be discharged from the chamber through the discharge conduit, the chamber has a baffle wall which extends upward from above the chamber floor to above the inlet end of the discharge conduit, the baffle wall substantially surrounds the inlet end of the discharge conduit, and the upper opening of the chamber and the inlet end of the discharge conduit are on opposite sides of the baffle wall; the method comprising the steps of:
   (a) delivering the first liquid through the upper opening and into the chamber,
   (b) passing the first liquid delivered into the chamber downward, under the baffle wall, and then upward and over the weir,
   (c) discharging the first liquid passing over the weir from the chamber through the discharge conduit, and
   (d) passing a second liquid through a heat exchange conduit located in the chamber and lower than the weir.

9. The method as claimed in claim 8, wherein the trap is a waste water trap.

10. The method as claimed in claim 9, wherein the trap is attached to, or integral with, a base or floor tray of a shower.

11. The method as claimed in claim 8, wherein the baffle wall is removably attachable to the inlet end of the discharge conduit.

12. The method as claimed in claim 8, wherein the baffle wall and the discharge conduit are each circularly cylindrical and mutually coaxial, and the heat exchange conduit is a circularly cylindrical annular chamber which surrounds, and is coaxial with, the discharge conduit and extends upward from the chamber floor.

13. The method as claimed in claim 12, wherein the heat exchange conduit includes a plurality of circularly cylindrical annular chambers each one of which surrounds and is coaxial with the discharge conduit and extends upward from the chamber floor, the baffle wall is one of a plurality of baffle walls each of which extends upward from above the chamber floor to above the inlet end of the discharge conduit, the baffle walls being circularly cylindrical and arranged coaxially and alternately with the annular chambers, the upper opening of the chamber being outside the radially outermost baffle wall, the method comprising the step of:

(e) passing the first liquid delivered into the chamber at the upper opening alternately downward and upward between adjacent baffle walls and annular chambers, the first liquid passing under each baffle wall and over each annular chamber, before flowing over the weir to be discharged from the chamber through the discharge conduit.

14. The method as claimed in claim 8, wherein the chamber has a side wall which extends between the bottom floor and the upper opening, and the chamber side wall, the baffle wall, and the discharge conduit are each circularly cylindrical and mutually coaxial.

* * * * *

UNITED STATES PATENT AND TRADEMARK OFFICE
CERTIFICATE OF CORRECTION

PATENT NO. : 7,996,933 B2  Page 1 of 1
APPLICATION NO. : 11/577291
DATED : August 16, 2011
INVENTOR(S) : Garth K. McGregor It is certified that error appears in the above-identified patent and that said Letters Patent is hereby corrected as shown below:

Column 2
Line 19, change "the a warm" to --the warm--.

Column 5
Line 39, change "46, 47 48" to --46, 47, 48--

Column 8
Line 25, change "in use" to --the first--

Signed and Sealed this
Eighth Day of November, 2011

David J. Kappos
*Director of the United States Patent and Trademark Office*